M. MEIROWSKY.
MAKING MICA PLATES.
APPLICATION FILED JULY 8, 1913.
1,241,539.
Patented Oct. 2, 1917.
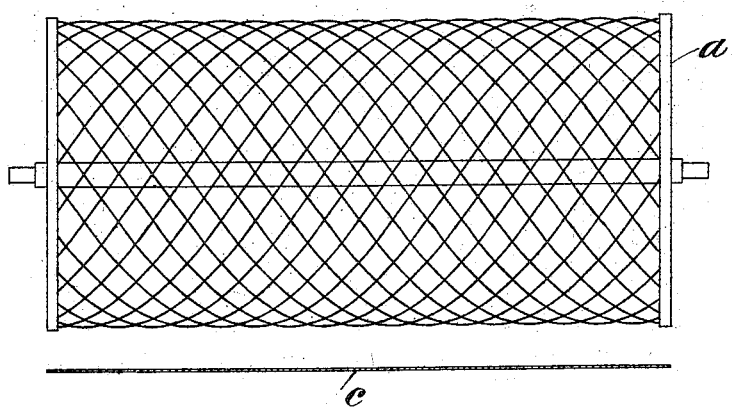
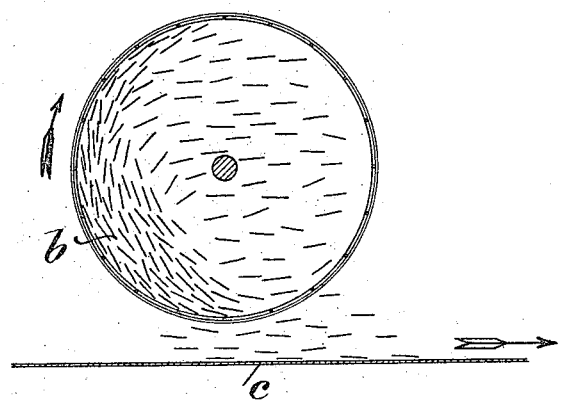
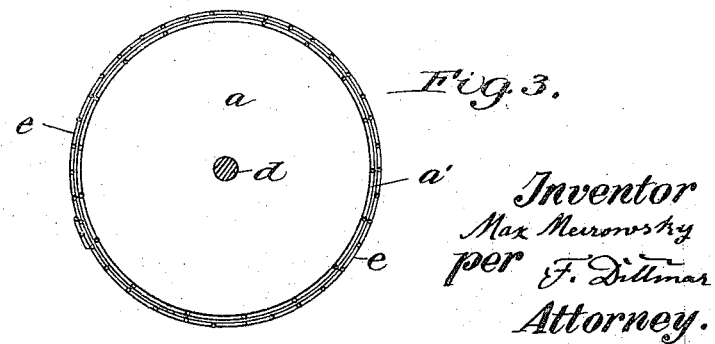
Witnesses:
C. D. Swett
B. H. Davis
Inventor
Max Meirowsky
per F. Dittmar
Attorney.

UNITED STATES PATENT OFFICE.

MAX MEIROWSKY, OF COLOGNE-LINDENTHAL, GERMANY.

MAKING MICA PLATES.

1,241,539.  Specification of Letters Patent.  Patented Oct. 2, 1917.

Application filed July 8, 1913. Serial No. 777,820.

*To all whom it may concern:*

Be it known that I, MAX MEIROWSKY, a subject of the King of Prussia, German Emperor, residing at Cologne-Lindenthal, in the Province of the Rhine, Kingdom of Prussia, German Empire, have invented certain new and useful Improvements in Making Mica Plates, of which the following is a specification.

This invention relates to a process and apparatus for the application of mica flakes to the adhesive backing in machines for cementing mica plates.

According to the process already known the application of the little flakes of mica to the adhesive backing in machines for making cemented mica sheets, is usually done so that the separate flakes are held fast by means of suction or air pressure against a sieve or a revolving roller and transferred to the cementing surface.

It has also been proposed to separate the flakes which stick fast together by means of disks which revolve at different speeds, and to transfer them to the cementing surface by means of a carrier band. All these known processes, some of which are very tedious do not fully correspond to the requirements of the material employed. The separate flakes of so-called split mica which are brought in this form from the countries of their origin, adhere tolerably firmly together by reason of their extraordinary thinness amounting to only from 1½ to 2½ hundredths of a millimeter as well as of their flexibility and the nature of their surface. This occasions special difficulties in overcoming this natural adhesion, but it is of great importance, if a uniform insulating plate is to be obtained, because in such a plate as far as possible each flake must be deposited singly. The process which is the outcome of the present invention for obtaining a separation of the mica flakes as complete as possible, consists in that the split mica is put into a revolving sieve drum, which is surrounded by a wide meshed wire fabric. The size of the sieve meshes corresponds to the size of the little flakes, as they are to be used singly for the insulating plate to be produced. On revolving the drum, the mica in consequence of its adhesion is raised and then falls freely down whereupon the little flakes separate one from another. The drum must of course be large enough to give a sufficient height of fall for the flakes. The little flakes divide upon falling and only that part passes through the net meshes which is small enough in consequence of its release from the others. If several flakes stick together which are together larger than the width of a mesh, they cannot pass through and are again carried up by the drum. This is repeated until all the little flakes are separated from one another and are passed through the sieve. In adhesive backings moving horizontally, the drum can be so arranged that the flakes fall immediately after passing through the meshes down upon the cementing surface. In a rotating cementing surface, however, it is more advantageous to carry the little flakes to the cementing point by means of a special carrier band. In order to remove the mica dust and the very small mica flakes, which are not serviceable, before the application of the flakes to the backing, the drum is provided provisionally with a wire fabric of smaller width of mesh and the dust passing through the drum when rotated is separated out. After a few revolutions, the separation is complete so that the narrow meshed network can be removed and the production of the plates can begin.

In the accompanying drawing:—

Figure 1 is a front elevation of the apparatus, and

Fig. 2 is a transverse section thereof.

Fig. 3 is a view similar to Fig. 2 showing the removable sieve in operative position.

Referring to the drawing, the apparatus comprises a drum formed of a pair of circular walls $a$, mounted in spaced relation on a shaft $d$, and connected, one with the other, by a tubular sieve fabric $a'$ of relatively coarse mesh. A second sieve section $e$ of relatively fine mesh, is adapted to be removably trained over the sieve $a'$ (Fig. 3) during the initial operation of the apparatus, as will be hereinafter more fully described.

In the operation, the mica to be treated is placed within the inner sieve $a'$, and the outer sieve $e$ is secured in position, so that when the shaft $d$ is suitably rotated, the finer particles of mica are discharged from the drum. The outer sieve $e$ is now removed, and the shaft is again rotated, during which operation the flakes of mica are bunched together within the drum at the point of the beginning of the upward travel of the latter, and in a manner which causes the flakes to fall singly through the meshes of the sieve, as is indicated in Fig. 2. A carrier $c$, of any suitable form such as an endless belt, is arranged imediately below the drum for conveying the mica flakes to the point of use.

Having now particularly described and ascertained the nature of my said invention and in what manner the same is to be performed, I declare that what I claim is:—

The process of treating mica in bulk for the separation and delivery of single flakes or sheets therefrom, which consists in revolving the mass for the separation and removal of the finer or useless particles therefrom, and subsequently revolving the remainder *in situ* in a manner, whereby the flakes or sheets are separated and delivered singly, substantially as and for the purpose set forth.

In testimony, whereof I have signed my name to this specification in the presence of two subscribing witnesses.

MAX MEIROWSKY.

Witnesses:
ANNIS VANDORY,
GERTRUD SCHÄFER.